US008624446B2

(12) United States Patent
Chung et al.

(10) Patent No.: US 8,624,446 B2
(45) Date of Patent: Jan. 7, 2014

(54) DOUBLY SALIENT PERMANENT MAGNET ELECTRIC MACHINE

(75) Inventors: Shi Uk Chung, Changwon (KR); Do Hyun Kang, Changwon (KR); Byung Chul Woo, Changwon (KR); Ji Won Kim, Busan (KR); Ji Young Lee, Changwon (KR); Seung Ryul Moon, Changwon (KR)

(73) Assignee: Korea Electrotechnology Research Institute, Changwon (KR)

( * ) Notice: Subject to any disclaimer, the term of this patent is extended or adjusted under 35 U.S.C. 154(b) by 335 days.

(21) Appl. No.: 12/796,846

(22) Filed: Jun. 9, 2010

(65) Prior Publication Data

US 2010/0327670 A1 Dec. 30, 2010

(30) Foreign Application Priority Data

Jun. 30, 2009 (KR) .......................... 10-2009-0059011

(51) Int. Cl.
*H02K 41/02* (2006.01)
(52) U.S. Cl.
USPC .................. 310/12.15; 310/12.24; 310/12.18; 310/12.25; 310/12.26
(58) Field of Classification Search
USPC ............ 310/12.15, 12.24, 12.18, 12.25, 12.26
See application file for complete search history.

(56) References Cited

U.S. PATENT DOCUMENTS

| | | | | | |
|---|---|---|---|---|---|
| 4,728,830 | A | * | 3/1988 | Gamble | 310/12.12 |
| 4,945,268 | A | * | 7/1990 | Nihei et al. | 310/12.22 |
| 5,066,897 | A | * | 11/1991 | Ueda et al. | 318/135 |
| 5,880,541 | A | * | 3/1999 | Hinds et al. | 310/12.19 |
| 6,476,524 | B1 | * | 11/2002 | Miyamoto et al. | 310/12.19 |
| 7,944,095 | B2 | * | 5/2011 | Kawai | 310/12.15 |
| 2004/0222705 | A1 | * | 11/2004 | Uchida | 310/12 |
| 2006/0012251 | A1 | * | 1/2006 | Miyata et al. | 310/12 |
| 2006/0012252 | A1 | * | 1/2006 | Miyata et al. | 310/12 |
| 2008/0001481 | A1 | * | 1/2008 | Miyaji et al. | 310/12 |
| 2009/0009010 | A1 | * | 1/2009 | Chung et al. | 310/46 |

* cited by examiner

*Primary Examiner* — Tran Nguyen
*Assistant Examiner* — Alex W Mok (57) ABSTRACT

Disclosed herein is a linear, curved or rotary electric machine. The electric machine includes first and second movers which are adjacent to each other and have a phase angle difference of 60° therebetween. The first mover includes phases U, V and W and the second mover includes phases /U, /V and /W. The electric machine of the present invention can reduce pulsations of thrust caused by end effect. In particular, in the case where the stator includes permanent magnets having the same poles and salient poles which alternate with the permanent magnets, the number of permanent magnets used can be reduced to half of that of a conventional linear electric machine.

10 Claims, 6 Drawing Sheets

DOUBLY SALIENT PERMANENT MAGNET ELECTRIC MACHINE

BACKGROUND OF THE INVENTION

1. Field of the Invention

The present invention relates generally to linear, curved or rotary electric machines and, more particularly, to an electric machine which includes first and second movers which are adjacent to each other and have a phase angle difference of 60° therebetween, wherein when the first mover includes phases U, V and W and the second mover includes phases /U, /V and /W, pulsations of thrust caused by end effect can be mitigated, and when a stator comprises an iron core having permanent magnets and salient poles which alternate with each other, the number of permanent magnets can be reduced to half of that of a conventional linear electric machine.

2. Description of the Related Art

Generally, linear electric machines have been widely used for precision position control. A permanent magnet linear synchronous motor is a representative example of such conventional linear electric machines. Typically, in a conventional permanent magnet linear synchronous motor, a mover includes an iron core and three-phase coils, and a stator includes an iron core and permanent magnets. Therefore, as the distance that the mover moves is increased, the number of permanent magnets used is increased, resulting in an increase in the production cost. In addition, due to end effect induced on an entry end and an exit end of the mover, there is pulsation of thrust and normal force.

SUMMARY OF THE INVENTION

Accordingly, the present invention has been made keeping in mind the above problems occurring in the prior art, and an object of the present invention is to provide an electric machine in which a stator comprises an iron core having permanent magnets and salient poles which alternate with each other, thus reducing the number of permanent magnets used, compared to the conventional linear electric machine, and which includes first and second movers which have phase angle difference of 60°, thus reducing pulsations of thrust and normal force.

Another object of the present invention is to provide an electric machine which can have various structures which are required of applied systems, for example, in which stators are disposed on opposite sides of a mover or movers are disposed on opposite sides of a stator, such that attractive force between the stator and the mover can be canceled.

In order to accomplish the above object, the present invention provides an electric machine which is provided with a pair of movers which have an electrical phase difference of 60°, thus reducing pulsations of thrust.

Furthermore, a stator may comprise an iron core having permanent magnets and salient poles which alternate with each other. Thus, the number of permanent magnets used can be reduced compared to that of the conventional permanent magnet linear synchronous motor.

Each of the pair of movers may include mover teeth in the quantity of a multiple of three which are arranged at regular intervals (α) with respect to the direction in which the movers move, and coils wound around the mover teeth.

In addition, the stator and the mover may be configured such that the salient poles of the stator and the corresponding mover teeth of the mover are skewed at predetermined angles and face each other.

Moreover, the electric machine may be configured such that stators having permanent magnets and salient poles are disposed on opposite sides of a mover or the same number of movers are disposed on opposite sides of a stator, such that attractive force between the stator and the mover can be canceled.

The electric machine may have an air core type structure such that stators having permanent magnets and salient poles are disposed at positions opposite to each other and three-phase coils are provided between the stators.

In detail, in an aspect, the present invention provides an electric machine, including: a stator; and a plurality of movers arranged at positions spaced apart from each other such that an electric phase difference therebetween is 60° or 180°. The movers linearly or curvedly move or rotate with respect to the stator. Each of the movers includes: mover teeth in multiples of three, the mover teeth being spaced apart from each other at regular intervals; and a phase coil wound around each of the mover teeth. The stator comprises an iron core having a plurality of salient poles. Permanent magnets are provided in depressions defined between the salient poles.

In another aspect, the present invention provides an electric machine, including: a stator; and a plurality of movers arranged at positions spaced apart from each other such that an electric phase difference therebetween is 60° or 180°. The movers linearly or curvedly move or rotate with respect to the stator. Each of the movers includes: mover teeth in multiples of three, the mover teeth being spaced apart from each other at regular intervals; and a phase coil wound around each of the mover teeth. The stator comprises a linear iron core. A plurality of permanent magnets is provided on the iron core. The permanent magnets are arranged such that opposite poles of the adjacent permanent magnets face each other.

In a further aspect, the present invention provides an electric machine, including: two stators; and a mover provided between the two stators, the mover linearly or curvedly moving or rotating with respect to the stators. The mover includes: mover teeth in multiples of three provided on each of opposite surfaces of the mover which face the two stators, the mover teeth being arranged at positions spaced apart from each other at regular intervals; and a phase coil wound around each of the mover teeth. Each of the two stators comprises an iron core. A plurality of salient poles is provided on a surface of the iron core facing the mover. Permanent magnets are provided in depressions defined between the salient poles, so that attractive force between the stators and the mover is canceled.

In yet another aspect, the present invention provides an electric machine, including: a stator; and two movers provided on opposite sides of the stator such that the two movers face each other, each of the two movers linearly or curvedly moving or rotating with respect to the stator. Each of the movers has on a surface thereof facing the stator: mover teeth in multiples of three, the mover teeth being spaced apart from each other at regular intervals; and a phase coil wound around each of the mover teeth. The stator comprises an iron core. A plurality of salient poles is provided on each of opposite surfaces of the iron core facing the movers, and permanent magnets are provided in depressions defined between the salient poles, so that attractive force between the stator and the movers is canceled.

The salient poles of the stator and the corresponding mover teeth of the mover may be skewed at predetermined angles and face each other.

The mover may comprise a plurality of movers each of which has mover teeth in multiples of three, and an electric phase difference between the movers may be 60° or 180°.

The movers may be mechanically integrated with each other by an integrated common iron core.

The phase coils of the first mover of the plurality of movers may have an electrical phase difference of 180° with respect to one of the phase coils of the second mover of the plurality of movers.

In still another aspect, the present invention provides an electric machine, including: at least one stator; and a mover linearly or curvedly moving or rotating with respect to the stator. The stator comprises an iron core. A plurality of salient poles is provided on a surface of the iron core facing the mover. Permanent magnets are provided in depressions defined between the salient poles. The mover comprises three-phase coils or phase coils configured such that three-phase coils are repeated in a direction in which the mover moves.

The stator may comprise two stators, and the mover may be provided between the two stators. Each of the two stators may have, on a surface thereof facing the mover, permanent magnets provided in depressions defined between the salient poles.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, preferred embodiments of the present invention will be described in detail with reference to the attached drawings, but the present invention is not limited to the embodiments and various modifications are possible using a combination of the embodiments. Furthermore, reference now should be made to the drawings, in which the same reference numerals are used throughout the different drawings to designate the same or similar components.

Electric machines described in the present invention are energy conversion devices which convert electric energy into kinetic energy or convert kinetic energy into electric energy, for example, including a motor, an actuator and a generator. In addition, the electric machines mean devices which implement the above-mentioned energy conversion using linear motion, rotation or a combination of linear motion and rotation.

Figure 1:
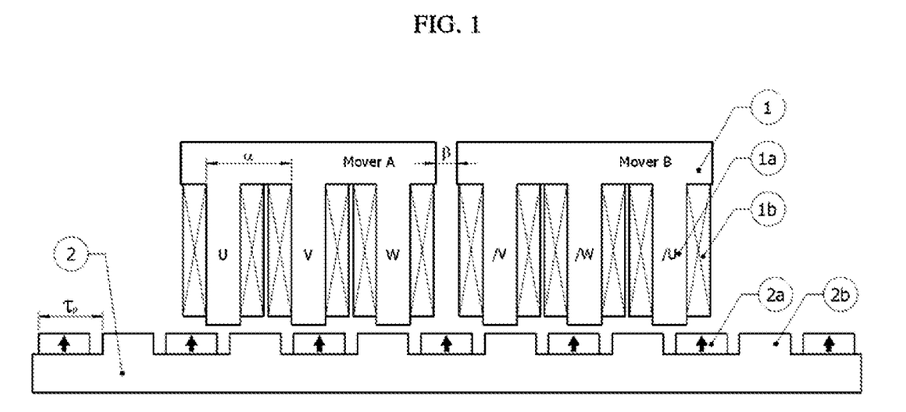
FIG. 1 is a view illustrating a mover and a stator of a linear electric machine, according to a first embodiment of the present invention.

FIG. 1 is a view illustrating the general construction of a linear electric machine and disposition of a first mover A and a second mover B which linearly move with respect to a stator 2, according to a first embodiment of the present invention. The first mover A and the second mover B are spaced apart from each other by β (an electrical phase angle of 60°=$\tau_p$/3, $\tau_p$ denotes a pole pitch). The first mover A includes phases U, V and W. The second mover B includes phases /U, /V and /W. Phase coils 1b of each of the first and second movers A and B are wound parallel to each other at regular intervals α, for example, such that a difference between electrical phase angles of the adjacent phase coils 1b becomes 120°. Here, the order of the phases /U, /V and /W of the second mover B is not unconditional. In other words, depending on the number of poles or the number of mover teeth 1a (for example, a multiple of three), the order of the phases /U, /V and /W may vary. Preferably, regardless of the order of coils, the phases /U, /V and /W of the phases coils 1b of the second mover B are arranged such that the phases /U, /V and /W have electrical phase differences of 180° with respect to the phases U, V and W of the phase coils of the first mover A. Here, '/U' denotes a phase difference of 180° with respect to the phase U. '/V' denotes a phase difference of 180° with respect to phase V. '/W' denotes a phase difference of 180° with respect to phase W.

Each of the first and second movers A and B (1) has phase coils 1b which have electrical phase differences of 180°. Hence, when necessary, β may be changed into an electrical phase angle of 180° ($\tau_p$).

In FIG. 1, although the first and second movers A and B (1) have been illustrated as being mechanically separated from each other, the present invention is not limited thereto. For example, a pair of movers A and B may be configured such that they are integrated with each other using an integrated iron core. In this case, mover teeth present in a multiple of three (for example, six mover teeth) are provided, and phase coils are provided on the six mover teeth having phases U, V, W, /U, /V and /W.

Furthermore, although the structure having the two movers A and B (1) has been illustrated as an example, one or more movers may be further provided, in other words, three or more movers may be provided. Of course, in this case, the three or more movers may be spaced apart from each other such that electrical phase differences of 60° or 180° therebetween exist, or they may be integrated with each other using an integrated iron core. Here, phase coils having phases U, V, W, /U, /V and /W may be repeatedly provided on mover teeth in multiples of three. In addition, each mover may have mover teeth in multiples of three. In this case, of course, the number of all mover teeth of three or more movers is a multiple of three.

As shown in FIG. 1, in the linear electric machine according to the embodiment of the present invention, the stator 2 has an iron core provided with stator salient poles 2b. Permanent magnets 2a are provided in depressions defined between the stator salient poles 2b. That is, the permanent magnets 2a and the stator salient poles 2b alternate on the iron core of the stator 2.

Figure 2:
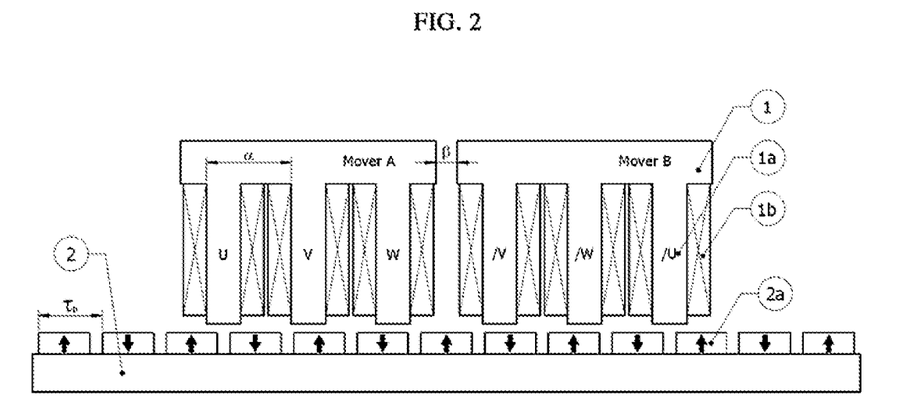
FIG. 2 is a view illustrating a mover and a stator of a linear electric machine, according to a second embodiment of the present invention.

FIG. 2 is a view illustrating a linear electric machine, according to a second embodiment of the present invention. The construction of two movers A and B is the same as that of the linear electric machine of FIG. 1, but in the embodiment of FIG. 2, the stator 2 includes only permanent magnets 2a and an iron core. In other words, in the linear electric machine according to the second embodiment, the stator 2 is configured such that permanent magnets 2a are provided on a linear stator iron core without having stator salient poles. Here, the permanent magnets 2a are arranged such that opposite poles of adjacent magnets 2a face each other.

Figure 3:
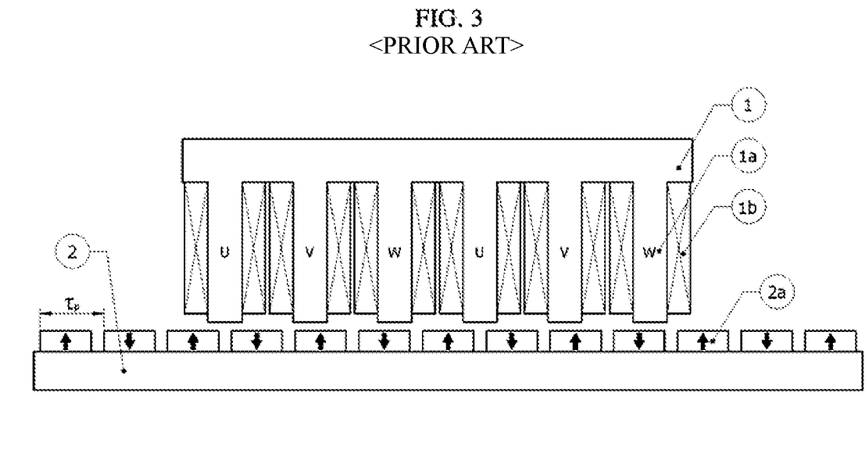
FIG. 3 is a view showing the construction of a conventional linear electric machine.

FIG. 3 is a view showing the construction of a conventional linear electric machine. In the conventional linear electric machine, a mover includes mover iron cores 1a which are mover teeth in multiples of three. Phase coils 1b having phases of U, V and W are repeatedly provided on the mover iron cores 1a. In a stator 2, permanent magnets 2a are provided on a linear stator iron core without having stator salient poles, in the same manner as that of FIG. 2. Furthermore, the permanent magnets 2a are arranged such that opposite poles of adjacent magnets 2a face each other. However, in the construction of the conventional linear electric machine, as the movement distance of the mover increases, the number of required permanent magnets increases, thus resulting in an increased production cost. Furthermore, due to the end effect induced on an entry end and an exit end of the mover, pulsations of thrust and normal force are caused. Therefore, this conventional technique is not suitable for precision position control.

Figure 4:
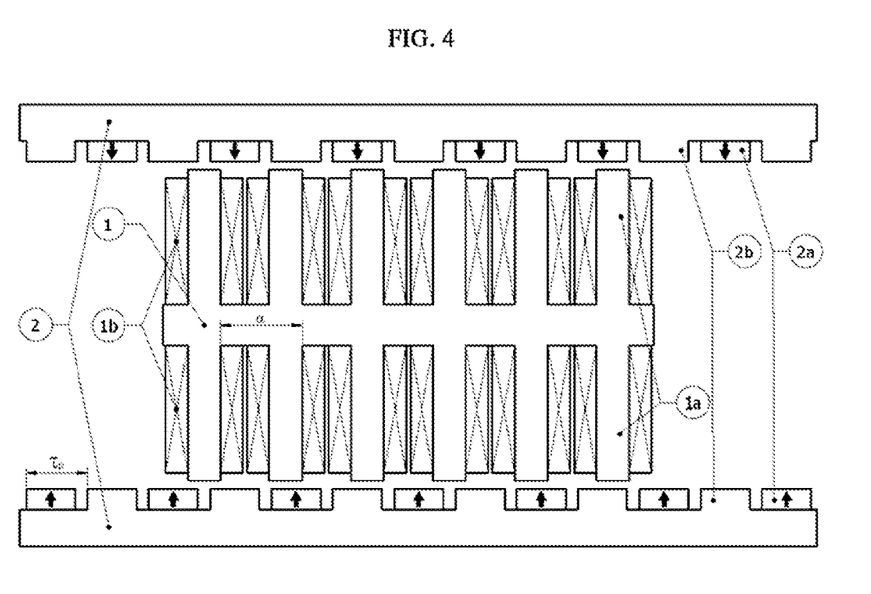
FIG. 4 is a view illustrating a linear electric machine in which two stators having permanent magnets and salient poles are disposed on opposite sides of a single mover to cancel the attractive force therebetween, according to a third embodiment of the present invention.

FIG. 4 is a view illustrating a linear electric machine, according to a third embodiment of the present invention. As shown in FIG. 4, the linear electric machine according to the third embodiment includes a mover 1 and two stators 2. The two stators 2 are disposed on opposite sides of the mover 1 with respect to a direction perpendicular to the direction in which the mover 1 moves. Permanent magnets 2a and stator salient poles 2b are provided on a surface of each stator 2 which faces the mover 1. Due to this structure, attractive force between the mover 1 and the two stators 2 can be canceled. Here, the mover 1 is configured such that mover teeth 1a in multiples of three are provided on each of the opposite sides of the mover 1 which face the two stators 2 and three-phase coils 1b are provided on the mover teeth 1a in a manner similar to that of FIG. 3. Furthermore, the mover 1 may comprise two or more movers which are configured such that phase coils having phases U, V, W, /U, /V and /W are repeatedly provided on each of opposite sides of the movers which have electrical phase differences of 60° or 180° in a manner similar to that of FIG. 1. Preferably, the two stators 2 which are opposite to each other are disposed such that the permanent magnets 2a of one stator 2 face the stator salient poles 2b of the other stator 2.

Figure 5:
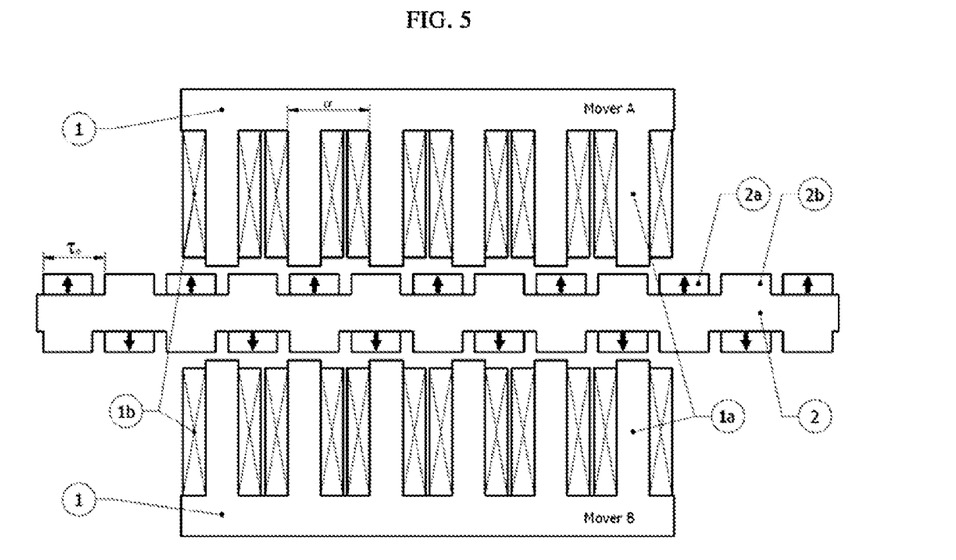
FIG. 5 is a view illustrating a linear electric machine in which two movers are disposed on opposite sides of a stator on each of both surfaces of which there are permanent magnets and salient poles to cancel the attractive force therebetween, according to a fourth embodiment of the present invention.

FIG. 5 is a view illustrating a linear electric machine, according to a fourth embodiment of the present invention. As shown in FIG. 5, two movers 1 are disposed at positions opposite to each other. A stator 2 is disposed between the two movers 1. Permanent magnets 2a and stator salient poles 2b which have the structure similar to those of FIG. 1 are provided on each of both surfaces of the stator 2 which faces the movers 1 with respect to the direction perpendicular to the direction in which the movers 1 move. Due to this structure, attractive force between the movers 1 and the stator 2 can be canceled. This embodiment is configured such that the mover 1 which has three-phase coils 1b in the same manner as that of the mover 1 of FIG. 3 is provided on each of opposite sides of the stator 2. Each of the movers 1 which are disposed on opposite sides of the stator 1 may comprise two or more movers which are configured such that phase coils having phases U, V, W, /U, /V and /W are repeatedly provided on the movers which have electrical phase differences of 60° or 180° in a manner similar to that of FIG. 1. Furthermore, with regard to the arrangement of the permanent magnets 2a and the stator salient poles 2b provided on both surfaces of the stator 2, it may be configured such that the permanent magnets 2a are provided on one surface of the stator 2 and the stator salient poles 2b are provided on the other surface of the stator 2.

Figure 6:
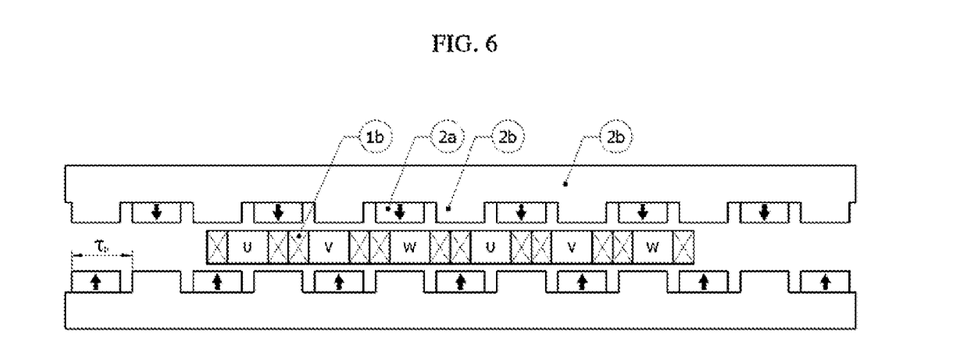
FIG. 6 is a view illustrating a linear electric machine in which two stators having permanent magnets and salient poles are disposed opposite to each other and an air core type mover having three-phase coils is disposed between the stators, according to a fourth embodiment of the present invention.

FIG. 6 is a view illustrating a linear electric machine, according to a fifth embodiment of the present invention. As shown in FIG. 6, the linear electric machine according to the fifth embodiment includes two stators 2 which are disposed at positions opposite to each other. Each stator 2 has permanent magnets 2a and stator salient poles 2b in a manner similar to that of the stator of FIG. 1. A mover is provided between the two stators 2. The mover includes phase coils 1b which are configured such that three-phase (U, V, W) coils are provided in the form of an air core, that is, without an iron core, or three-phase coils are repeatedly provided with respect to the direction in which that mover moves. Preferably, the two stators 2 which are opposite to each other are disposed such that the permanent magnets 2a of one stator 2 face the stator salient poles 2b of the other stator 2. In this embodiment, although the linear electric machine has been illustrated as having two stators 2, only one stator may be disposed on one side of the mover or two or more stators may be disposed on each of opposite sides of the mover.

Figure 7:
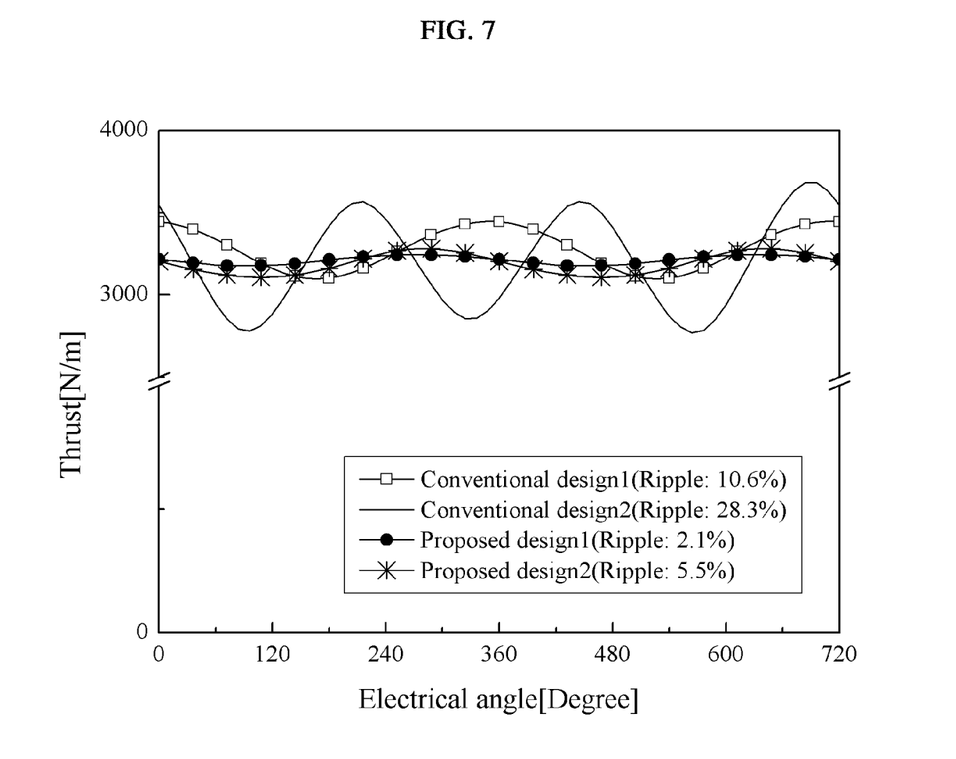
FIG. 7 is a graph analytically comparing thrust of linear electric machines proposed in conventional techniques and the present invention.
Figure 8:
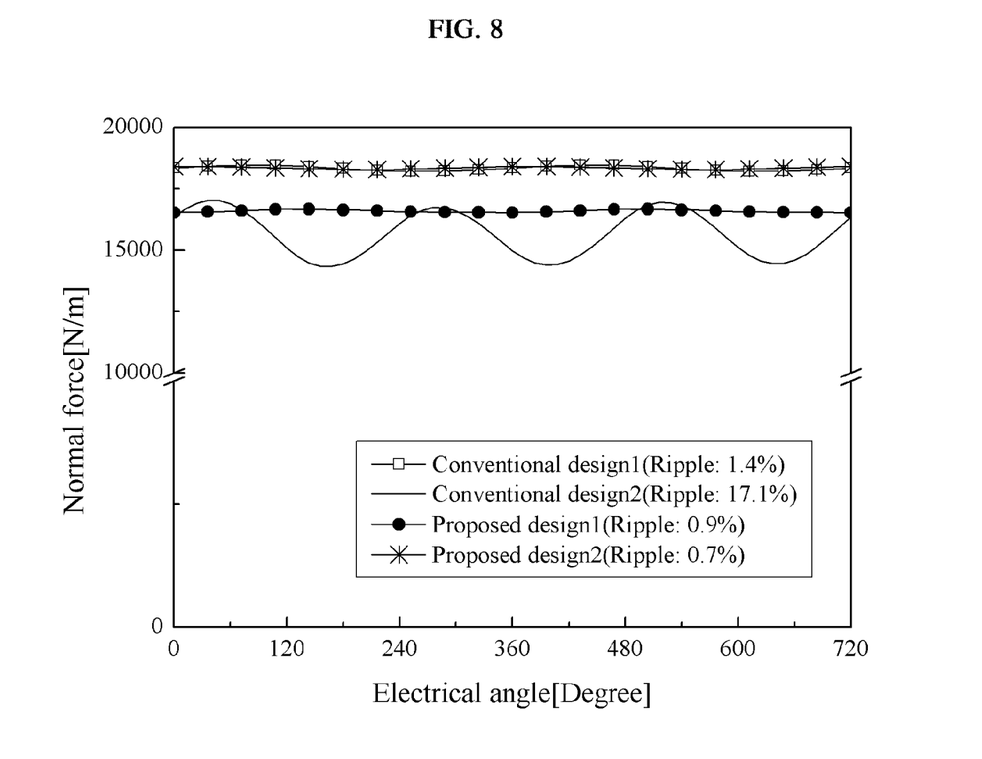
FIG. 8 is a graph analytically comparing the attractive force of linear electric machines proposed in conventional techniques and the present invention.

FIG. 7 is a graph analytically comparing thrust of linear electric machines proposed in conventional techniques and the present invention, and FIG. 8 is a graph analytically comparing attractive force of linear electric machines proposed in conventional techniques and the present invention.

In FIGS. 7 and 8, the conventional design 1 shows the case of a conventional linear electric machine having the structure of FIG. 3. The conventional design 2 denotes the case where the mover of the conventional linear electric machine of FIG. 3 is combined with the iron core type stator of FIG. 1 having the stator salient poles. Furthermore, in FIGS. 7 and 8, the proposed design 1 shows the case of FIG. 1 where the stator comprises the iron core having the permanent magnets and the stator salient poles and the first mover and the second mover are electrically spaced apart from each other at an interval of 60°. The proposed design 2 shows the case of FIG. 2 where the stator includes the permanent magnets and the linear iron core and the first mover and the second mover are electrically spaced apart from each other at an interval of 60°.

As can be understood from FIGS. 7 and 8, the linear electric machine proposed in the present invention can reduce pulsations of thrust and attractive force, compared to those of the conventional techniques. In particular, in the case where the stator proposed in the present invention is used in the structure of the conventional linear electric machine, it is to be understood that the conventional design 2 markedly increases pulsations of thrust and attractive force. However, the design 1 proposed in the present invention can generate almost the same thrust as that of the conventional technique despite using only half the number of permanent magnets as does the conventional technique. Furthermore, the proposed design 1 can reduce pulsations of thrust to ⅕ of those of the conventional technique and the attractive force by 10%. In addition, the proposed design 2 can generate almost the same thrust as that of the conventional technique and reduce pulsations of thrust by 50%.

As described above, in a linear electric machine according to the present invention, a stator includes permanent magnets and stator salient poles which alternate each other. Thus, the amount of permanent magnets used can be reduced, compared to the conventional technique.

Furthermore, the linear electric machine includes first and second movers which are electrically spaced apart from each other at a phase angle of 60°, thus reducing pulsations of thrust and normal force. In addition, the linear electric machine is configured such that attractive force can be canceled in such a way that the movers or stators are disposed at positions opposite to each other.

Moreover, the structure of the electric machine according to the present invention can also be applied to a rotary electric machine.

The linear or rotary electric machine according to the present invention can ensure low noise, low vibration, high precision and high thrust. Therefore, the present invention can be used in fields in which direct operation or precision position control is required, or in various machines, such as a generator, a compressor, a processing machine, an industrial electric machine, etc., in which linear or rotary motion is required.

Although the preferred embodiments of the present invention have been disclosed for illustrative purposes, those skilled in the art will appreciate that various modifications, additions and substitutions are possible, without departing from the scope and spirit of the invention. For example, the present invention may be configured such that a stator has a curved shape and a mover or movers curvedly move along the stator. Furthermore, if the mover of the linear electric machine of the present invention is applied to a stator and the stator of the present invention is applied to a rotor, the present invention can be used as a rotary electric machine in which the rotor rotates with respect to the stator. Meanwhile, the terms "mover", "rotor" and "stator" used in the description of the embodiments are relative concepts. In other words, when necessary, the case where the stator may move while the mover or rotor is stationary can fall within the bounds of the present invention. Moreover, the stator or the mover may be configured such that salient poles of the stator and teeth of the mover are skewed at predetermined angles and face each other. As such, the bounds of the present invention are not limited to the above-mentioned embodiments and must be defined by the accompanying claims or the equivalent of the claims.

What is claimed is:

1. An electric machine, comprising:
   a first stator;
   a plurality of movers arranged at positions spaced apart from each other such that an electric phase difference between two adjacent movers is 60° or 180°, the plurality of movers linearly or curvedly moving or rotating with respect to the first stator; and
   a second stator having the same structure as the first stator,
   wherein the plurality of movers are provided between the first stator and the second stator,
   wherein each of the plurality of movers comprises:
      mover teeth in multiples of three, the mover teeth being spaced apart from each other at regular intervals; and
      a plurality of phase coils wound around each of the mover teeth, each of the plurality of phase coils of a first mover of the plurality of movers having a corresponding phase coil of a second mover with an electrical phase difference of 180° with respect to the respective phase coil of the first mover,
   wherein the plurality of phase coils include three-phase coils configured in the form of an air core, or phase coils configured in the form of an air core such that three-phase coils are repeated in a direction in which the plurality of movers move, and
   wherein the first and second stators each include an iron core having a plurality of salient poles, with permanent magnets provided in depressions defined between the salient poles, and
   wherein the salient poles of the first and second stators and the corresponding mover teeth of the plurality of movers are skewed at predetermined angles and face each other.

2. The electric machine as set forth in claim 1, wherein the electric phase difference between the two adjacent movers is 180°.

3. An electric machine, comprising:
   a stator;
   a first plurality of movers arranged at positions spaced apart from each other such that an electric phase difference between two adjacent movers is 60° or 180°, the first plurality of movers linearly or curvedly moving or rotating with respect to the stator; and
   a second plurality of movers having the same structure as the first plurality of movers,
   wherein the first plurality of movers and the second plurality of movers are provided on opposite sides of the stator,
   wherein each of the first plurality and second plurality of movers comprises:
      mover teeth in multiples of three, the mover teeth being spaced apart from each other at regular intervals, and
      a plurality of phase coils wound around each of the mover teeth, each of the plurality of phase coils of a first mover of the first plurality and the second plurality of movers having a corresponding phase coil of a second mover of the first plurality and the second plurality of movers with an electrical phase difference of 180° with respect to the respective phase coil of the first mover,
   wherein the plurality of phase coils includes three-phase coils configured in the form of an air core, or phase coils configured in the form of an air core such that three-phase coils are repeated in a direction in which the first plurality and the second plurality of movers move,
   wherein the stator comprises an iron core having a plurality of salient poles, with permanent magnets provided in depressions defined between the salient poles, and
   wherein the salient poles of the stator and the corresponding mover teeth of the first plurality and the second plurality of movers are skewed at predetermined angles and face each other.

4. The electric machine as set forth in claim 3, wherein the first plurality of movers and the second plurality of movers are mechanically integrated with each other by an integrated common core, respectively.

5. The electric machine as set forth in claim 3, wherein the electric phase difference between the two adjacent movers is 180°.

6. An electric machine, comprising:
   a stator;
   a first plurality of movers arranged at positions spaced apart from each other such that an electric phase difference between two adjacent movers is 60° or 180°, the first plurality of movers linearly or curvedly moving or rotating with respect to the stator, a second plurality of movers having the same structure as the first plurality of movers,
wherein the first plurality of movers and the second plurality of movers provided respectively on opposite sides of the stator,
wherein each of the first plurality and the second plurality of movers comprises: mover teeth in multiples of three, the mover teeth being spaced apart from each other at regular intervals; and a plurality of phase coils wound around each of the mover teeth, each of the phase coils of a first mover of the first plurality and the second plurality of movers having a corresponding phase coil of a second mover of the first plurality and the second plurality of movers with a phase difference of 180° with respect to the respective phase coil of the first mover; and
the stator comprises an iron core having a plurality of salient poles, with permanent magnets provided in depressions defined between the salient poles, or comprises an iron core, with a plurality of permanent magnets provided on the iron core, the plurality of permanent magnets being arranged such that opposite poles of the adjacent permanent magnets face each other,
wherein the first plurality of movers and the second plurality of movers are mechanically integrated with each other by an integrated common iron core.

7. The electric machine as set forth in claim 6, further comprising: a second stator having the same structure as the stator,
wherein the plurality of movers provided between the stator and the second stator.

8. The electric machine as set forth in claim 6, wherein the first plurality and the second plurality of movers comprise three-phase coils configured in the form of an air core, or phase coils configured in the form of an air core such that three-phase coils are repeated in a direction in which the first plurality and the second plurality of movers move.

9. The electric machine as set forth in claim 6, wherein the salient poles of the stator and the corresponding mover teeth of the first plurality and the second plurality of movers are skewed at predetermined angles and face each other.

10. The electric machine as set forth in claim 6, wherein the electric phase difference between the two adjacent movers is 180°.

\* \* \* \* \*